United States Patent
Kumar et al.

(10) Patent No.: US 10,911,374 B1
(45) Date of Patent: Feb. 2, 2021

(54) SOFTWARE DEFINED WIDE AREA NETWORK (SD WAN) ENABLED NETWORK FABRIC FOR CONTAINERS

(71) Applicant: Riverbed Technology, Inc., San Francisco, CA (US)

(72) Inventors: Amit Kumar, San Francisco, CA (US); Sheshagiri Rao Mallipedhi, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 16/585,955

(22) Filed: Sep. 27, 2019

Related U.S. Application Data

(60) Provisional application No. 62/738,724, filed on Sep. 28, 2018.

(51) Int. Cl.
*H04L 12/933* (2013.01)
*H04L 12/24* (2006.01)
(Continued)

(52) U.S. Cl.
CPC .............. *H04L 49/10* (2013.01); *H04L 12/28* (2013.01); *H04L 12/66* (2013.01);
(Continued)

(58) Field of Classification Search
CPC ..... H04L 12/28; H04L 12/4641; H04L 12/66; H04L 29/08135; H04L 29/08396–08423; H04L 29/0845–08459; H04L 29/08648; H04L 41/00; H04L 41/08–0803; H04L 45/00–02; H04L 45/38; H04L 45/50; H04L 45/56–563; H04L 45/586; H04L 45/64; H04L 47/00; H04L 49/00–10; H04L 49/70; H04L 65/10; H04L 65/1013; H04L 67/10; H04L 67/1061;
(Continued)

(56) References Cited

U.S. PATENT DOCUMENTS

2015/0112933 A1* 4/2015 Satapathy ........... H04L 41/5019
707/634
2018/0241824 A1* 8/2018 He ...................... H04L 12/4641
(Continued)

OTHER PUBLICATIONS

Yaguache et al., "Enabling Edge Computing Using Container Orchestration and Software Defined Networking" Oct. 21, 2019.*

*Primary Examiner* — Brendan Y Higa
(74) *Attorney, Agent, or Firm* — Park, Vaughan, Fleming & Dowler LLP; Laxman Sahasrabuddhe

(57) ABSTRACT

Systems and techniques are described for creating a software-defined wide-area-network (SD-WAN) enabled network fabric for containers. Embodiments can configure one or more virtual networks on a network node, wherein the one or more virtual networks are used for creating the SD-WAN enabled network fabric for containers. Next, the embodiments can deploy a virtual gateway on the network node by executing the virtual gateway image. The embodiments can then create a container network interface configuration based on network address information of the one or more virtual networks and the virtual gateway, and execute the container network interface configuration, thereby enabling containers on the network node to communicate via the SD-WAN enabled network fabric.

18 Claims, 8 Drawing Sheets

(51) Int. Cl.
*H04L 12/66* (2006.01)
*H04L 29/12* (2006.01)
*H04L 12/26* (2006.01)
*H04L 12/28* (2006.01)
*H04L 29/08* (2006.01)
*H04L 12/771* (2013.01)
*H04L 12/715* (2013.01)
*H04L 12/751* (2013.01)
*G06F 9/455* (2018.01)

(52) U.S. Cl.
CPC .... *H04L 29/08648* (2013.01); *H04L 41/0803* (2013.01); *H04L 41/085* (2013.01); *H04L 43/14* (2013.01); *H04L 45/02* (2013.01); *H04L 45/563* (2013.01); *H04L 45/64* (2013.01); *H04L 61/256* (2013.01); *G06F 2009/45595* (2013.01)

(58) Field of Classification Search
CPC ............. H04L 67/1068; G06F 9/45558; G06F 2009/45562–45595
See application file for complete search history.

(56) References Cited

U.S. PATENT DOCUMENTS

| | | | | |
|---|---|---|---|---|
| 2018/0359323 | A1* | 12/2018 | Madden | H04L 67/104 |
| 2019/0245811 | A1* | 8/2019 | Sergeev | H04L 49/70 |
| 2019/0268777 | A1* | 8/2019 | Simon | H04W 16/14 |
| 2020/0067831 | A1* | 2/2020 | Spraggins | H04L 45/306 |
| 2020/0252234 | A1* | 8/2020 | Ramamoorthi | H04L 45/64 |
| 2020/0273314 | A1* | 8/2020 | Bordeleau | G08B 25/016 |
| 2020/0274772 | A1* | 8/2020 | A | H04W 88/12 |

\* cited by examiner

SOFTWARE DEFINED WIDE AREA NETWORK (SD WAN) ENABLED NETWORK FABRIC FOR CONTAINERS

RELATED APPLICATION

This application claims benefit of U.S. Provisional Patent Application No. 62/738,724, having the same title and inventors, filed on 28 Sep. 2018, the contents of which are herein incorporated by reference in their entirety for all purposes.

BACKGROUND

This disclosure generally relates to data networks. More specifically, this disclosure relates to a software-defined wide-area-network (SD-WAN) enabled network fabric for containers.

FIGS. 1A-1C illustrate different system architectures. FIG. 1A illustrates a system architecture that includes operating system (OS) 104 that abstracts the underlying hardware 102. The system can optionally include a set of binaries or library 106 that extends the functionality of OS 104. Applications 108, 110, and 112 can execute on top of library 106 if it exists, or directly on OS 104. In this architecture, the applications share all system resources. If a particular application uses a large portion of resources, it would slow other applications down. Each application can be executed on a separate physical machine to prevent resource contention between the applications, but this solution is costly, not scalable, and likely to cause resource wastage due to low utilization.

FIG. 1B illustrates a system architecture that uses virtual machines. In this architecture, a host (e.g., a physical server) includes OS 124 and hardware 122. Hypervisor 126 is provided on top of OS 124 to allow multiple virtual machines (VMs), such as VMs 128, 130, and 132, to simultaneously execute and share the host's computing resources. Each VM includes a complete software stack comprising an OS, a library layer (optional), and applications (depicted in FIG. 1B by using the letter "A"). Each VM can be thought of a virtual computer (like the one shown in FIG. 1A) that is implemented in software. The architecture shown in FIG. 1B allows applications to be isolated between VMs, and provides a high-level of security because the information of one application that is executing on one VM cannot be freely accessed by another application that is executing on another VM.

FIG. 1C illustrates a system architecture that uses containers. As in other architectures, OS 144 provides an abstraction of hardware 142. Container runtime 146 executes on OS 144, and provides a platform or environment in which one or more containers (e.g. 148, 150, and 152) can execute. Containers 148, 150, and 152 are similar to VMs, except that the isolation between containers is less strict than the isolation between VMs. In particular, applications executing in containers 148, 150, and 152 share the resources of OS 144. Although containers have less isolation than VMs, they are significantly more lightweight compared to VMs. Like a VM, a container has its own filesystem, central processing unit (CPU), memory, process space, etc. However, unlike a VM, a container does not include a full OS. Note that, because containers are decoupled from the underlying hardware and OS, containers are portable across different OSs and hardware.

The architecture shown in FIG. 1C is rapidly gaining popularity due to the advantages that containers provide over VMs. Some of these advantages include fast and efficient application creation and deployment, observability of detailed application health metrics, portability across various hardware and OSs, and high resource utilization.

SUMMARY

This disclosure provides methods and apparatuses for creating a SD-WAN enabled network fabric for containers. During operation, some embodiments can instruct an SD-WAN controller to create a virtual gateway instance that corresponds to the network node. Next, the embodiments can download a virtual gateway image from the SD-WAN controller. The embodiments can then discover network interfaces on the network node. Next, the embodiments can configure one or more virtual networks on the network node, wherein the one or more virtual networks are used for creating the SD-WAN enabled network fabric for containers. The embodiments can then deploy a virtual gateway on the network node by executing the virtual gateway image. Next, the embodiments can create a container network interface configuration based on network address information of the one or more virtual networks and the virtual gateway. The embodiments can then execute the container network interface configuration, thereby enabling containers on the network node to communicate via the SD-WAN enabled network fabric.

In some embodiments, configuring one or more virtual networks on the network node can comprise configuring a virtual WAN and a virtual local-area-network (LAN).

Some embodiments can configure network address translation (NAT) on a virtual network in the one or more virtual networks. Some embodiments can communicate with the SD-WAN controller to ensure that the virtual gateway is online. Some embodiments can launch a health monitor that monitors one or more processes (including the virtual gateway) executing on the network node. Some embodiments can launch a configuration synchronizer that ensures that a configuration stored in the SD-WAN controller is consistent with the container network interface configuration.

DETAILED DESCRIPTION

Figure 1A:
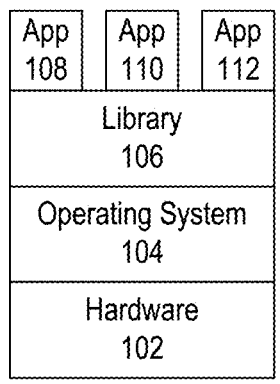
FIGS. 1A-1C illustrate different system architectures.
Figure 1B:
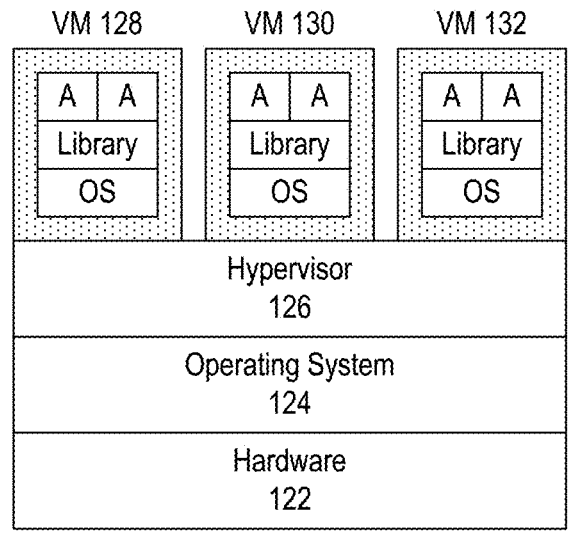
Figure 1C:
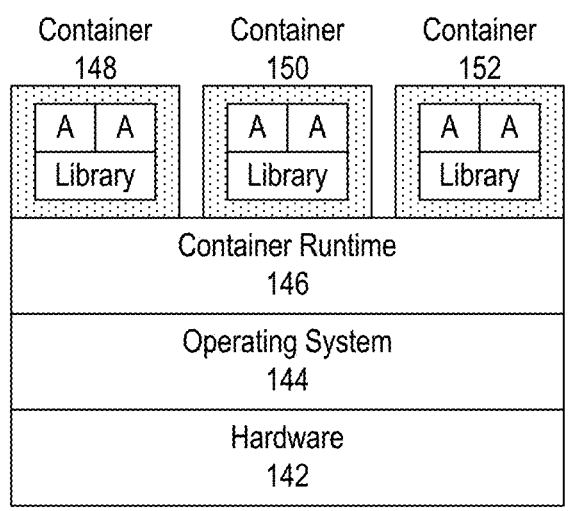

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, network devices, network nodes, network appliances, etc.

According to one definition, a data communication network (or "network" for short) is an interconnection of one or more devices or nodes that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices or nodes for sending, receiving, directing, and optimizing network data traffic.

Communication between two nodes of a network is typically accomplished by using a layered software architecture, which is often referred to as a networking software stack or simply a networking stack. A given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer specific headers is usually performed at each layer as the payload moves from higher layers to lower layers. The receiving host generally performs the reverse of this process by processing headers of each layer as the payload moves from the lowest layer to the highest layer.

In an SD-WAN, the control plane of the network is separated from the data plane. Individual network elements in the SD-WAN forward traffic based on the forwarding mechanism that is implemented in the network elements (i.e., the data plane comprises the interconnected set of network elements). However, the information about how to forward traffic (i.e., the control plane that includes forwarding tables and/or routing tables) is determined and distributed from controller nodes (e.g., SD-WAN controllers) in the SD-WAN; these controller nodes implement the control plane. In other words, the control plane is operated independently from the network elements. A network element can generally include any device that is capable of handling and/or processing network traffic, such as Internet Protocol (IP) routers, Multi-Protocol Label Switching (MPLS) switches, Ethernet switches, and WAN optimization devices. WAN optimization devices optimize network traffic to improve WAN performance in reading and/or writing data over a network. WAN optimization devices typically compress data (e.g., by performing de-duplication) and perform other optimization tasks (e.g., caching, prefetching, etc.) to improve WAN performance. WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

SD-WAN can be viewed as an enhanced network management technique that is used for configuring and managing the control plane to enable fast, dynamic, and programmatically efficient network configuration, with the goal of improving network performance and monitoring. SD-WAN technology fills the gap between, on the one hand, static and complex network deployments and, on the other hand, the needs of the end-users which include flexibility, monitoring, and user-friendly troubleshooting and configuration.

Figure 2A:
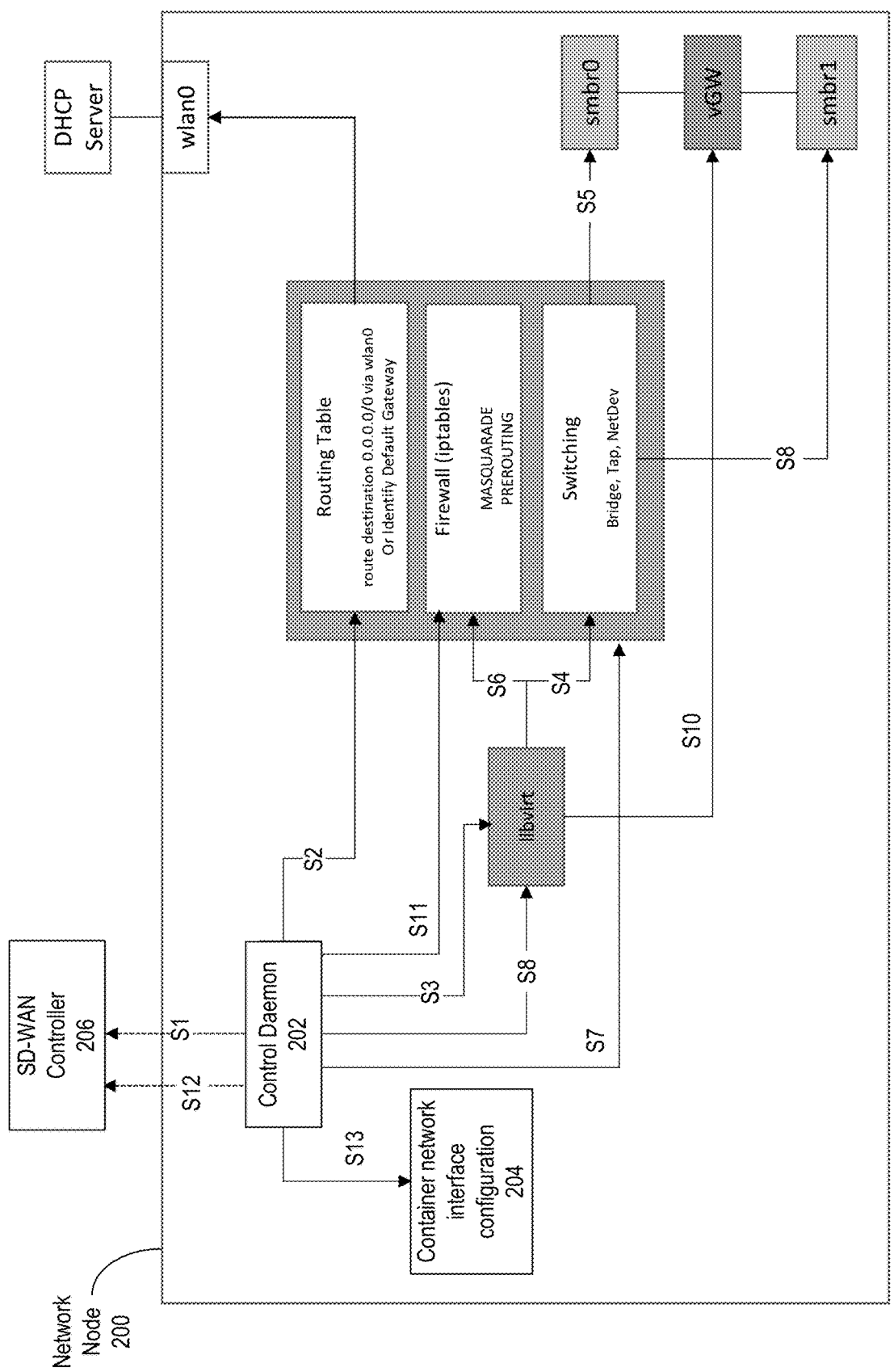
FIG. 2A illustrates a process for using SD-WAN technology to configure a network fabric for containers with network address translation (NAT) in accordance with some embodiments described herein.

FIG. 2A illustrates a process for using SD-WAN technology to configure a network fabric for containers with NAT in accordance with some embodiments described herein. Configuring the network fabric for containers comprises performing steps S1 through S13 on network node 200, as shown in FIG. 2A. Control daemon 202 can begin by modeling a virtual gateway in SD-WAN controller 206, and downloading an image for the virtual gateway (step S1). Next, control daemon 202 can discover the public facing interface and IP address (step S2).

Control daemon 202 can then create a virtual network using libvirt (step S3). "libvirt" is an open-source application programming interface (API), daemon and management tool for managing platform virtualization. In general, any library or tool for managing platform virtualization that supports creating virtual networks can be used in step S3 to create a virtual network. Next, libvirt (or any other mechanism for platform virtualization management) can create virtual network "smbr0" (step S4) by, e.g., by using Kernel NetLink in Linux if the node is running Linux. The virtual network "smbr0" (which is a bridge in Linux) has now been created (step S5) at this point in the process. Next, libvirt (or any other mechanism for platform virtualization management) can configure NAT (step S6), e.g., by using Network Masquerade in Linux if the node is running Linux. Control daemon 202 can then create virtual network "smbr1" (step S7), e.g., by using Kernel NetLink in Linux if the node is running Linux.

The virtual network "smbr1" (which is a bridge in Linux) has now been created (step S8) at this point in the process. Next, control daemon 202 can deploy the virtual gateway (step S9), e.g., by using libvirt to execute the image that was downloaded from the SD-WAN controller 206.

Step S10 corresponds to the point in the process when the virtual gateway has been deployed and is executing. Control daemon 202 can then establish IPSec port forwarding (step S11). Next, control daemon 202 can confirm that the virtual gateway has successfully connected with SD-WAN controller 206, and is online (step S12). Control daemon 202 can then generate a container network interface (CNI) configuration (step S13). Next, control daemon 202 can optionally initiate a health monitor process and initiate a process to synchronize configuration.

Figure 2B:
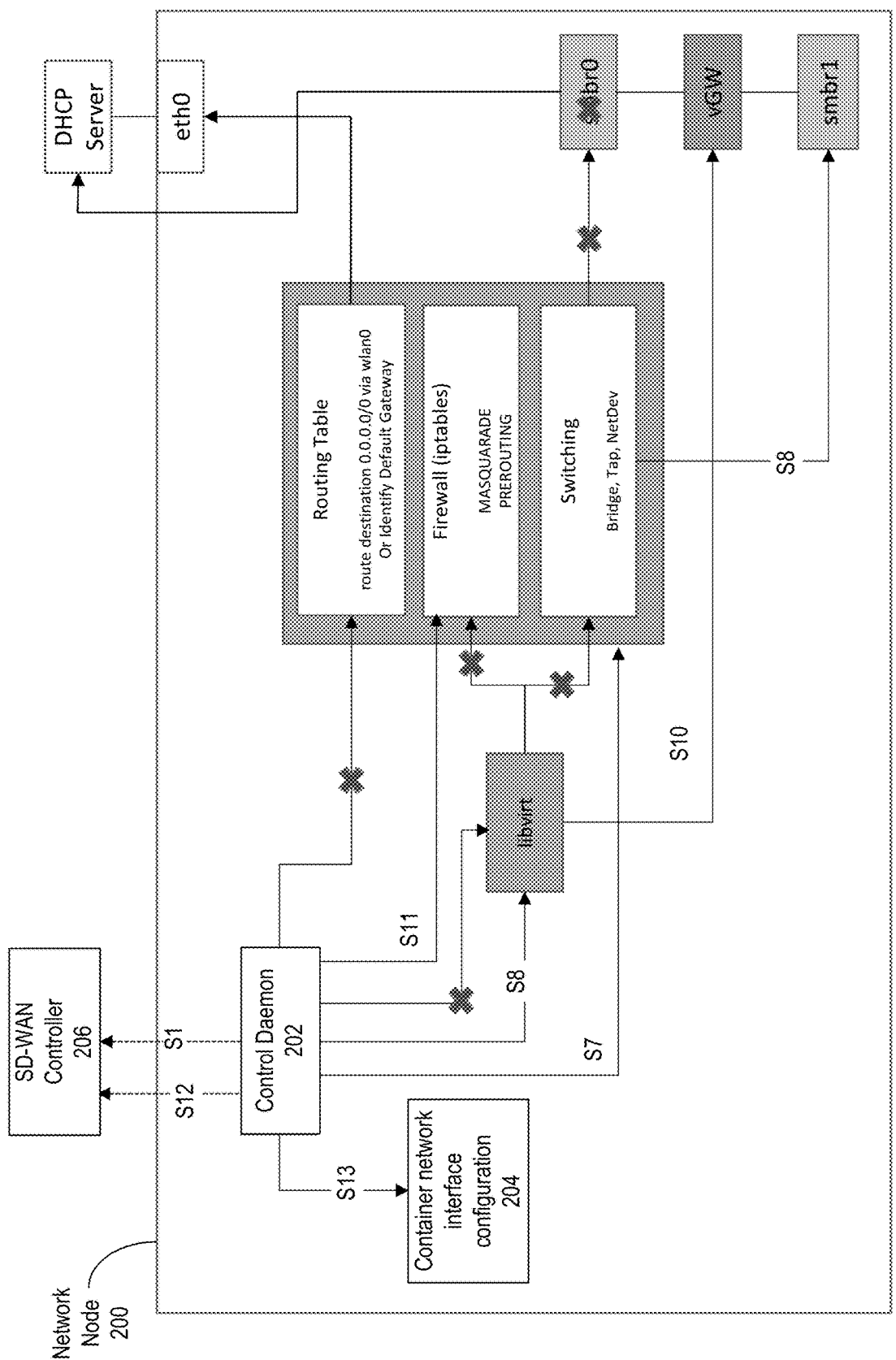
FIG. 2B illustrates a process for using SD-WAN technology to configure a network fabric for containers without NAT in accordance with some embodiments described herein.

FIG. 2B illustrates a process for using SD-WAN technology to configure a network fabric for containers without NAT in accordance with some embodiments described herein. The process in FIG. 2B is similar to the process in FIG. 2A, except that steps S2 through S6 are not performed. This is shown in FIG. 2B with an "X" on the arrows that correspond to those steps.

Figure 3:
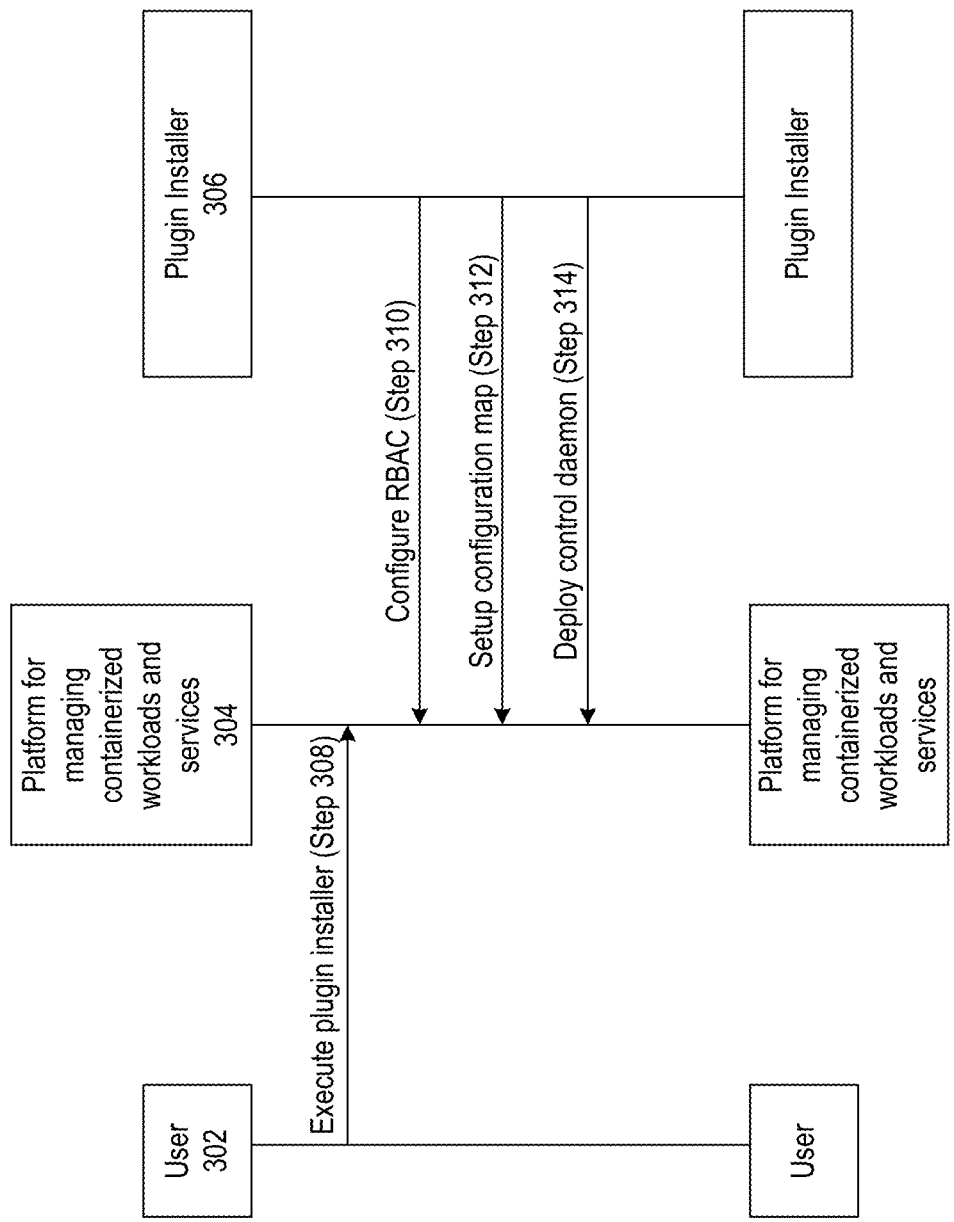
FIG. 3 illustrates a sequence diagram for installing a plugin that implements an SD-WAN enabled network fabric for containers in accordance with some embodiments described herein.

FIG. 3 illustrates a sequence diagram for installing a plugin that implements an SD-WAN enabled network fabric for containers in accordance with some embodiments described herein. The process comprises actions taken by three entities: user 302, platform for managing containerized workloads and services 304 (e.g., Kubernetes), and plugin installer 306. User 302 can refer to an executing user-level application or process that can provide a command to the platform for managing containerized workloads and services 304.

In step 308, the process can begin by user 302 instructing the platform for managing containerized workloads and services 304 to execute plugin installer 306 for installing a control daemon which, when installed and executed, configures a network fabric for containers using SD-WAN technology. Next, in step 310, plugin installer 306 can configure role-based access control (RBAC) so that the control daemon has access to the required computer or network resources. In step 312, the plugin installer 306 can then setup a configuration map so that the control daemon is portable across the platform for managing containerized workloads and services 304. Finally, in step 314, the plugin installer 306 can instruct the platform for managing containerized workloads and services 304 to deploy the control daemon. After the control daemon has been deployed, the control daemon can then instantiate containers and pods (which are groups of containers that are managed as a single executable unit) which, when executed, implements a network fabric for containers using SD-WAN technology.

Figure 4:
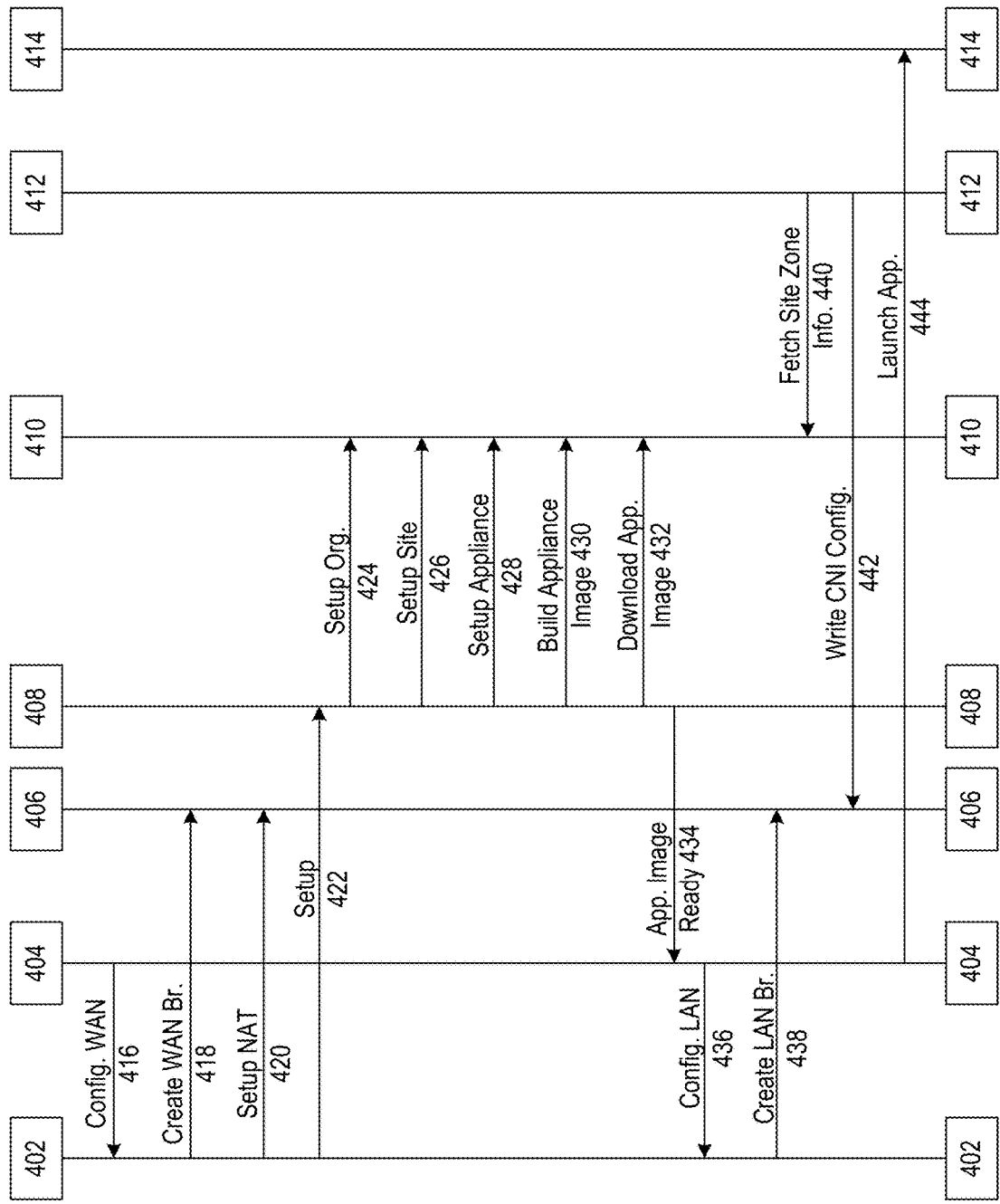
FIG. 4 illustrates a sequence diagram for creating an SD-WAN enabled network fabric for containers in accordance with some embodiments described herein.

FIG. 4 illustrates a sequence diagram for creating an SD-WAN enabled network fabric for containers in accordance with some embodiments described herein. The process comprises the following entities: configuration module 402, control daemon 404, host 406, SD-WAN controller client 408, SD-WAN controller 410, container network interface 412, and appliance container 414. In some embodiments, configuration module 402, control daemon 404, SD-WAN controller client 408, and container network interface 412 together implement the SD-WAN enabled network fabric for containers.

Control daemon 404 can instruct the configuration module 402 to configure a WAN bridge (step 416), which can then instruct (e.g., by calling the appropriate library routines in the host machine) host 406 to create the WAN bridge (step 418). Next, configuration module 402 can instruct (e.g., by calling the appropriate library routines in the host machine) host 406 to setup NAT (step 420). Configuration module 402 can then instruct SD-WAN controller client 408 to setup a connection with SD-WAN controller 410 (step 422). Accordingly, SD-WAN controller client 408 can communicate with SD-WAN controller 410 to setup an organization for each cluster (step 424), setup a site for each node in the cluster (step 426), setup an appliance in each node of the cluster (step 428), and build an appliance image for each appliance (step 430).

Next, the appliance images can be downloaded to each node (step 432). SD-WAN controller client 408 can then inform control daemon 404 that the appliance image is ready (step 434). Control daemon 404 can then instruct configuration module 402 to configure a LAN bridge (step 436). Accordingly, configuration module 402 can instruct (e.g., by calling the appropriate library routines in the host machine) host 406 to create the LAN bridge (step 438).

Next, container network interface 412 can fetch site and zone information from SD-WAN controller 410 and write the container network interface configuration to host 406. Finally, control daemon 404 can launch the appliance image. The appliance image (which is executing within a container) can now communicate with other containers via the SD-WAN enabled network fabric that was created by the combined actions of configuration module 402, control daemon 404, SD-WAN controller client 408, and container network interface 412.

Figure 5:
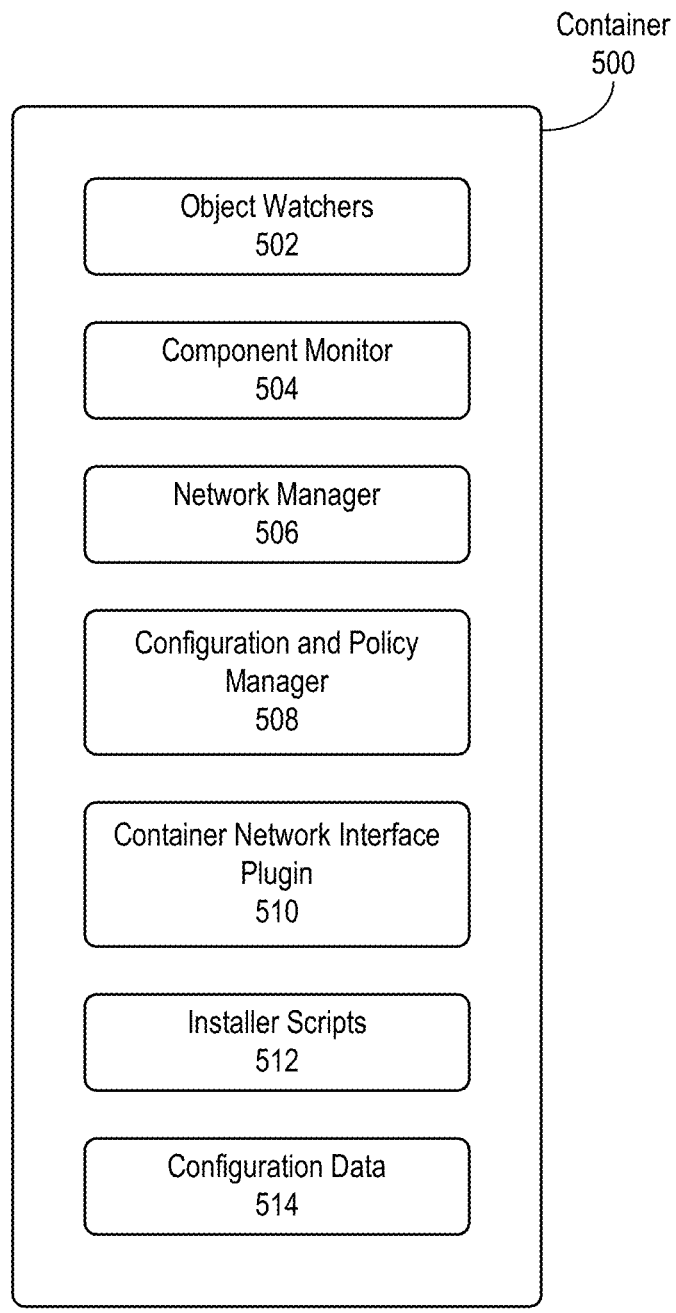
FIG. 5 illustrates components of a control daemon in accordance with some embodiments described herein.

FIG. 5 illustrates components of a control daemon in accordance with some embodiments described herein. A control daemon can be implemented as container 500, and can include the following components: object watchers 502, component monitor 504, network manager 506, configuration and policy manager 508, container network interface plugin 510, installer scripts 512, and configuration data 514.

Object watchers 502 can watch processes to monitor object creation in the platform or environment in which one or more containers and processes can execute. Component monitor 504 can monitor the state of control daemon components, i.e., the components shown in FIG. 5. Configuration and policy manager 508 can manage object models and configurations that are created in the SD-WAN controller. Container network interface plugin 510 can implement the container networking interface. Installer scripts 512 can implement an installer for a given container orchestration environment. Configuration data 514 can contain the configuration and secrets that are generated or defined during deployment and execution of the control daemon.

Network manager 506 can be responsible for configuring WAN/LAN networks on a given node in a cluster. Specifically, network manager 506 can (1) perform WAN Discovery (i.e., locate the WAN interface on a host), (2) configure network bridge for WAN, and (3) configure NAT. If the subnet used for WAN uplink network is a large IP network, then it will need to be managed on each node in a cluster. Alternatively, the network manager 506 allows for specifying WAN network to connect a gateway. Network manager 507 can also validate that the WAN selected allows to reach to any network address. Note that the WAN uplink must be configured for DHCP. Network manager 506 can also configure as many LAN networks as required, schedule zone monitor using configuration and policy manager, perform appropriate changes, monitor LAN network usage, and trigger dynamic workload balancing.

Figure 6:
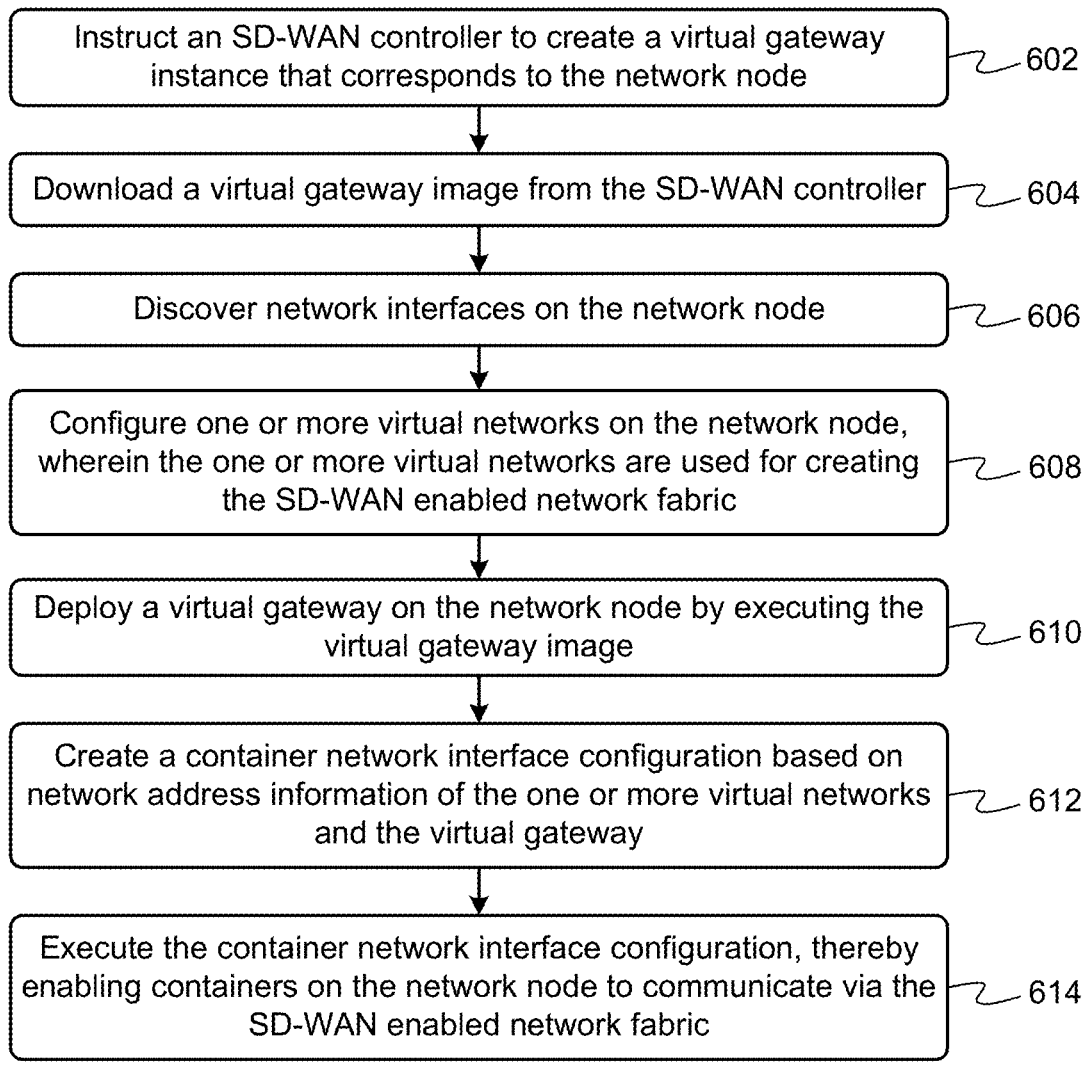
FIG. 6 illustrates a process for using SD-WAN technology to create a network fabric for containers in accordance with some embodiments described herein.

FIG. 6 illustrates a process for using SD-WAN technology to create a network fabric for containers in accordance with some embodiments described herein. The process can be performed by a network node, and begin by instructing an SD-WAN controller to create a virtual gateway instance that corresponds to the network node (step 602).

Next, the process can download a virtual gateway image from the SD-WAN controller (step 604). The process can then discover network interfaces on the network node (step 606). Next, the process can configure virtual networks on the network node, wherein the virtual networks are used for creating the network fabric for the containers (step 608). The process can then deploy a virtual gateway on the network node by executing the virtual gateway image (step 610). Next, the process can create a container network interface configuration based on network address information of the virtual networks and the virtual gateway (step 612). The process can then execute the container network interface configuration, thereby enabling containers on the network node to communicate via the SD-WAN enabled network fabric (step 614).

In some embodiments, configuring one or more virtual networks on the network node can comprise configuring a virtual WAN and a virtual LAN. Some embodiments can configure NAT on a virtual network in the one or more virtual networks. Some embodiments can communicate with the SD-WAN controller to ensure that the virtual gateway is online. Some embodiments can launch a health monitor that monitors one or more processes (including the virtual gateway) executing on the network node. Some embodiments can launch a configuration synchronizer that ensures that a configuration stored in the SD-WAN controller is consistent with the container network interface configuration.

In some embodiments, IP address management (IPAM) for pods/containers is delegated to the dynamic host configuration protocol (DHCP) server running inside a virtual gateway through a bridge CNI plugin configured for the LAN bridge as delegate CNI. Each time a container is assigned an IP address, a custom application can be created in the SD-WAN controller with pod/container's name as application name. The pod/container's name can be used to configure network policies in SD-WAN controller at a later point in time.

Some embodiments can use a special Kubernetes ConfigMap to configure communication policies among containers. A default policy can allow for all guests connected to the LAN to connect to Internet. In some embodiments, the control daemon can watch for changes to the configuration map, and when a change is detected, the control daemon can implement appropriate network policies in the SD-WAN controller.

In some embodiments, users can update the configuration map to enforce container communication policies. Pod/container names can be used as application names to allow/deny internal or external access.

Some embodiments described in this disclosure leverage an SD-WAN implementation's policy and model driven approach to allow for container workload connectivity over an encrypted and secure channel, e.g., in a Kubernetes/Docker cluster. Specifically, some embodiments provide a network plugin for Docker and Kubernetes that allows container workloads to be connected across hosts within a cluster or across different clusters.

Benefits of embodiments described herein include, but are not limited to, (1) enabling container connectivity across hosts in managed/hosted private cloud, across hosts in on-premises private cloud, between hosts in private cloud and hosts in public cloud, and between hosts in different cloud providers, (2) provides encrypted and secure connection using SD-WAN overlay, (3) provides centralized policy control for container application connectivity, (4) provides centralized configuration management to control application communication, (5) provides connectivity over transport agnostic SD-WAN, (6) connectivity across datacenters, (6) extends all benefits of the SD-WAN implementation to container workloads, e.g., visibility, policy driven path selection, and application Identification and application based traffic policies.

Figure 7:
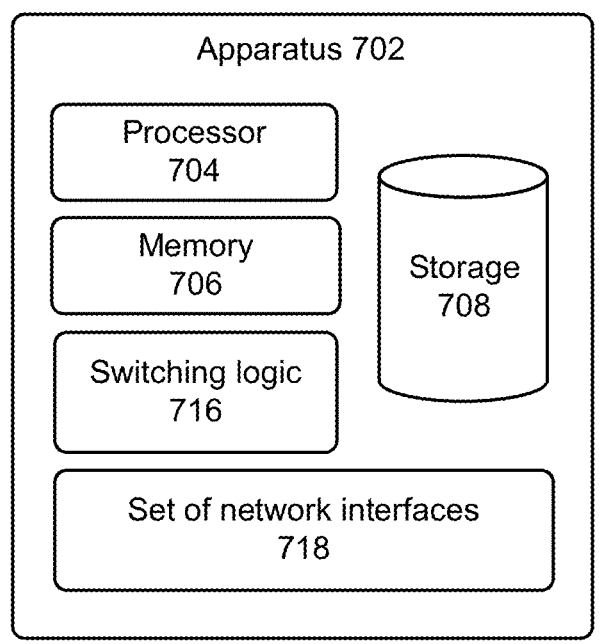
FIG. 7 illustrates an apparatus in accordance with some embodiments described herein.

FIG. 7 illustrates an apparatus in accordance with some embodiments described herein. Apparatus 702 (e.g., a network device, a network node, etc.) can comprise processor 704, memory 706 (e.g., a volatile or non-volatile random access memory), and storage 708 (e.g., a flash memory device or a disk drive). Storage 708 can store data and executable code. The components in apparatus 702 can communicate with one another using a communication mechanism (not shown in FIG. 7), e.g., a bus, a backplane, and/or a switching fabric. Executable code stored in storage 708 can include instructions that, when executed by processor 704, cause apparatus 702 to perform one or more methods that are implicitly or explicitly described in this disclosure. Storage 708 can also store any data that is required by any processes that are performed by apparatus 702.

Apparatus 702 can also include switching logic 716 and set of network interfaces 718. Set of network interfaces 718 can be used to transmit data to and/or receive data from other communication devices. Switching logic 716 can forward network traffic received on one or more network interfaces in accordance with switching/forwarding/routing information stored in apparatus 702. Specifically, switching logic 716 can be configured by processor 704 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method performed by a processor in a network node to create a software-defined wide-area-network (SD-WAN) enabled network fabric for containers, the method comprising:
instructing an SD-WAN controller to create a virtual gateway instance that corresponds to the network node;
downloading a virtual gateway image from the SD-WAN controller;
discovering network interfaces on the network node;
configuring one or more virtual networks on the network node, wherein the one or more virtual networks are used for creating the SD-WAN enabled network fabric for containers;
deploying a virtual gateway on the network node by executing the virtual gateway image;
creating a container network interface configuration based on network address information of the one or more virtual networks and the virtual gateway; and
executing the container network interface configuration, thereby enabling containers on the network node to communicate via the SD-WAN enabled network fabric.

2. The method of claim 1, wherein configuring one or more virtual networks on the network node comprises configuring a virtual WAN and a virtual local-area-network (LAN).

3. The method of claim 1, further comprising configuring network address translation (NAT) on a virtual network in the one or more virtual networks.

4. The method of claim 1, further comprising communicating with the SD-WAN controller to ensure that the virtual gateway is online.

5. The method of claim 1, further comprising launching a health monitor that monitors one or more processes executing on the network node.

6. The method of claim 1, further comprising launching a configuration synchronizer that ensures that a configuration stored in the SD-WAN controller is consistent with the container network interface configuration.

7. A non-transitory computer-readable storage medium storing instructions that, when executed by a processor in a network node, cause the network node to perform a method to create a software-defined wide-area-network (SD-WAN) enabled network fabric for containers, the method comprising:
instructing an SD-WAN controller to create a virtual gateway instance that corresponds to the network node;
downloading a virtual gateway image from the SD-WAN controller;
discovering network interfaces on the network node;
configuring one or more virtual networks on the network node, wherein the one or more virtual networks are used for creating the SD-WAN enabled network fabric for containers;
deploying a virtual gateway on the network node by executing the virtual gateway image;
creating a container network interface configuration based on network address information of the one or more virtual networks and the virtual gateway; and
executing the container network interface configuration, thereby enabling containers on the network node to communicate via the SD-WAN enabled network fabric.

8. The non-transitory computer-readable storage medium of claim 7, wherein configuring one or more virtual networks on the network node comprises configuring a virtual WAN and a virtual local-area-network (LAN).

9. The non-transitory computer-readable storage medium of claim 7, further comprising configuring network address translation (NAT) on a virtual network in the one or more virtual networks.

10. The non-transitory computer-readable storage medium of claim 7, further comprising communicating with the SD-WAN controller to ensure that the virtual gateway is online.

11. The non-transitory computer-readable storage medium of claim 7, further comprising launching a health monitor that monitors one or more processes executing on the network node.

12. The non-transitory computer-readable storage medium of claim 7, further comprising launching a configuration synchronizer that ensures that a configuration stored in the SD-WAN controller is consistent with the container network interface configuration.

13. A network node, comprising:
a processor; and
a non-transitory computer-readable storage medium storing instructions that, when executed by the processor, cause the network node to perform a method to create a software-defined wide-area-network (SD-WAN) enabled network fabric for containers, the method comprising:
instructing an SD-WAN controller to create a virtual gateway instance that corresponds to the network node;
downloading a virtual gateway image from the SD-WAN controller;
discovering network interfaces on the network node;
configuring one or more virtual networks on the network node, wherein the one or more virtual networks are used for creating the SD-WAN enabled network fabric for containers;
deploying a virtual gateway on the network node by executing the virtual gateway image;
creating a container network interface configuration based on network address information of the one or more virtual networks and the virtual gateway; and
executing the container network interface configuration, thereby enabling containers on the network node to communicate via the SD-WAN enabled network fabric.

14. The network node of claim 13, wherein configuring one or more virtual networks on the network node comprises configuring a virtual WAN and a virtual local-area-network (LAN).

15. The network node of claim 13, further comprising configuring network address translation (NAT) on a virtual network in the one or more virtual networks.

16. The network node of claim 13, further comprising communicating with the SD-WAN controller to ensure that the virtual gateway is online.

17. The network node of claim 13, further comprising launching a health monitor that monitors one or more processes executing on the network node.

18. The network node of claim 13, further comprising launching a configuration synchronizer that ensures that a configuration stored in the SD-WAN controller is consistent with the container network interface configuration.

* * * * *